United States Patent [19]
Ericsson et al.

[11] Patent Number: 5,956,637
[45] Date of Patent: *Sep. 21, 1999

[54] SUBSCRIBER DATABASE MANAGEMENT IN A MOBILE TELECOMMUNICATIONS SYSTEM

[75] Inventors: Jonas Ericsson, Stockholm, Sweden; Damian Lawniczak, Aachen, Germany

[73] Assignee: Telefonaktiebolaget L M Ericsson (publ), Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/604,092

[22] Filed: Feb. 20, 1996

[51] Int. Cl.$^6$ .............................. H04M 3/42; H04Q 7/20
[52] U.S. Cl. ..................... 455/414; 455/433; 455/405; 379/111
[58] Field of Search .......................... 379/91.01, 91.02, 379/111, 112, 113, 114, 121, 128, 127, 133, 134, 140, 355, 196, 197; 455/406, 414, 433, 446, 564, 403, 405, 422, 550, 517

[56] References Cited

U.S. PATENT DOCUMENTS

| | | | |
|---|---|---|---|
| 4,893,330 | 1/1990 | Franco | 379/91.02 |
| 5,260,987 | 11/1993 | Mauger | 379/58 |
| 5,267,308 | 11/1993 | Jokinen et al. | 455/564 |
| 5,274,845 | 12/1993 | Wang . | |
| 5,285,494 | 2/1994 | Sprecher et al. . | |
| 5,329,578 | 7/1994 | Brennan et al. | 379/67 |
| 5,353,331 | 10/1994 | Emery et al. | 379/58 |
| 5,371,780 | 12/1994 | Amitay | 379/58 |
| 5,390,234 | 2/1995 | Bar-Noy et al. | 379/59 |

(List continued on next page.)

FOREIGN PATENT DOCUMENTS 0 666 700 A1  8/1995  European Pat. Off. .
44 41 753 A1  6/1995  Germany .

OTHER PUBLICATIONS

ISS '95, World Telecommunications Congress, International Switching Symposium, Advanced Switching Technologies for Universal Telecommunications at the Beginning of the 21st Century Berlin, Apr. 23–28, 1995, vol. 1, Apr. 23, 1995, Verband Deutscher Elektrotechniker (VDE) et al, pp. 431–435, Damian Lawniczak, "Design Options for the DDB Network for Mobile Applications in UMTS" (whole document).

Performance Evaluation Review, vol. 20, No. 1/03, May 1, 1994, pp. 287–300, Ananharam V et al.: "Optimization Of A Database Hierachy For Mobility Tracking In A Personal Communications Network".

3rd Annual Intern. Conf. Universal Personal Communications, Jan. 1, 1994, pp. 345–349, Casares V et al: "Evaluation Studies Of DDB Architecture With Hierarchical Structure".

IEEE Journal On Selected Areas In Communications, vol. 13, No. 5, Jun. 1, 1995, pp. 893–907; Eynard C et al.: "A Methodology For The Performance Evaluation Of Data Query Strategies In Universal Mobile Telecommunication Systems (UMTS)".

*Primary Examiner*—Dwayne D. Bost
*Assistant Examiner*—Tracy M. Legree
*Attorney, Agent, or Firm*—Jenkins & Gilchrist, P.C.

[57] ABSTRACT

A method and apparatus for dynamically maintaining a subscriber database of a cellular telecommunications system. The method and apparatus allows creation of a personalized location pointer structure, personalized subscriber database and personalized outgoing call search list for an individual mobile subscriber. The personalized pointer structure, personalized subscriber database and personalized search list are determined based on mobile subscriber movement history and behavior within the system. Each of the location pointer structure, subscriber database and search list may be reconfigured as the system operator desires to account for changes in mobile subscriber behavior.

11 Claims, 10 Drawing Sheets

Called Subscribers

| | 1 | 2 | 3 | |
|---|---|---|---|---|
| no $_X$ | 2148554728 | 5089398295 | 6176769121 | |
| DN $_X$ | 18 | 39 | 23 | |
| Calls $_X$ | 7 | 10 | 14 | - - - - - → |
| Time $_X$ | 11.9.95.10.59 | 11.9.95.3.51 | 11.7.95.4.52 | |

U.S. PATENT DOCUMENTS

| | | |
|---|---|---|
| 5,396,543 | 3/1995 | Beeson, Jr et al. . |
| 5,400,392 | 3/1995 | Nagashima et al. ...................... 379/60 |
| 5,408,683 | 4/1995 | Ablay et al. ........................... 455/33.1 |
| 5,412,375 | 5/1995 | Wood ................................ 340/825.03 |
| 5,490,203 | 2/1996 | Jain et al. ................................. 379/59 |
| 5,504,804 | 4/1996 | Widmark et al. ....................... 455/414 |
| 5,583,917 | 12/1996 | Jonsson ...................................... 379/60 |
| 5,592,531 | 1/1997 | Cheng et al. .......................... 455/31.2 |
| 5,592,546 | 1/1997 | Takahashi .............................. 379/355 |
| 5,694,393 | 12/1997 | Kaye ....................................... 370/408 |
| 5,737,701 | 4/1998 | Rosenthal et al. ...................... 455/411 |
| 5,742,905 | 4/1998 | Pepe et al. ............................. 455/461 |
| 5,749,052 | 5/1998 | Hidem et al. ........................... 455/406 |

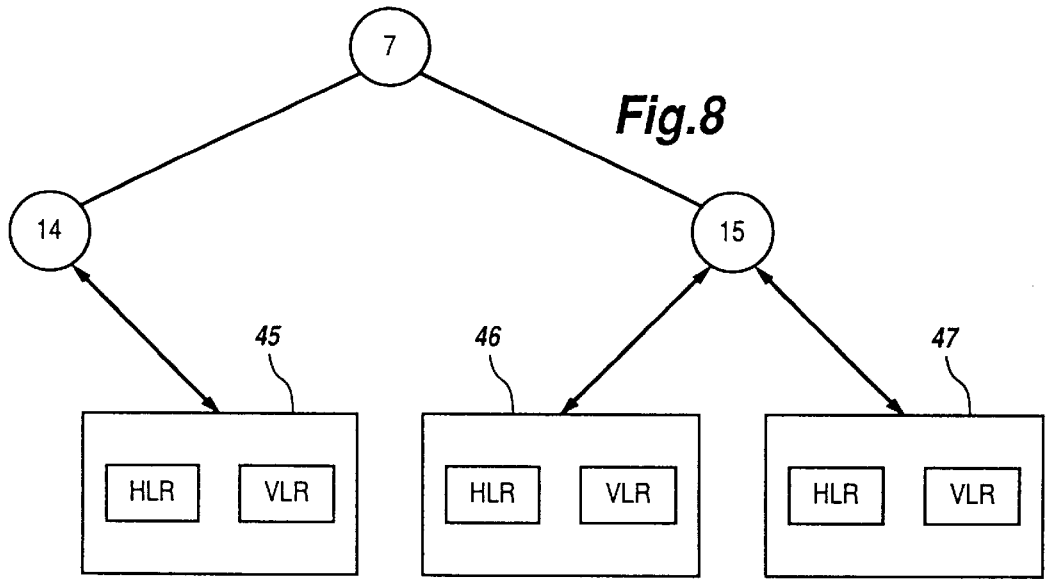
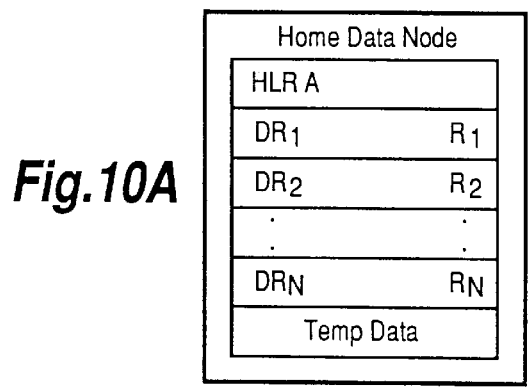
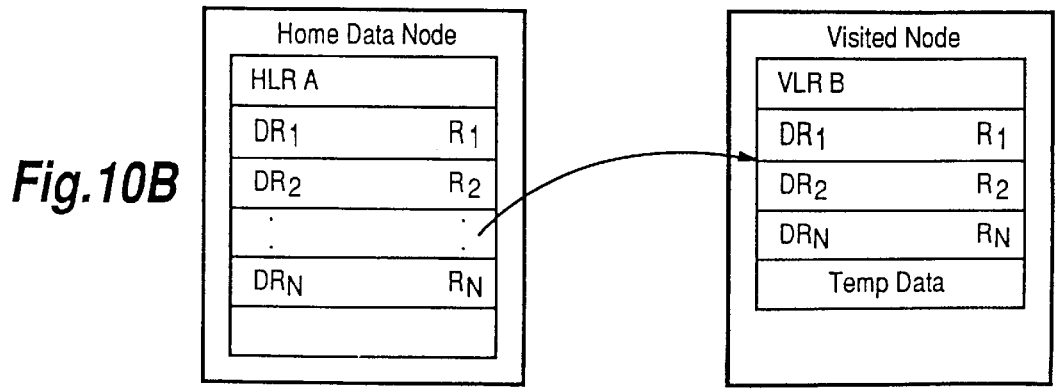

SUBSCRIBER DATABASE MANAGEMENT IN A MOBILE TELECOMMUNICATIONS SYSTEM

BACKGROUND OF THE INVENTION

1. Field of the Invention

This invention relates generally to telecommunications systems having mobile subscribers and, more particularly, to a method and system for managing a subscriber database in a cellular telecommunications system.

2. History of the Prior Art

A universal mobile telephone system (UMTS) is a mobile telephone system in which each subscriber is assigned a unique personal number. A subscriber can be contacted by using the personal number, no matter where the subscriber is located within the system. The personal number is unique for each subscriber and, once assigned, does not change even if the subscriber changes his permanent home location within the system.

Because a UMTS could potentially contain millions of subscribers, the storage and handling of subscriber location information and subscriber data presents problems not found in present day mobile radio systems.

In present day mobile radio systems it is usual to provide one common home location register (HLR) database for a number of mobile switching centers (MSCs) in order to centralize and simplify maintenance. The HLR database contains location information and other records on a large number of subscribers, for example, 100,000 or more subscribers, according to subscriber number, that are assigned the coverage area of the MSCs as a home system. A visitor location register (VLR) is also provided, e.g. one in each MSC. The VLR contains necessary data related to mobile stations not assigned the coverage area of the MSCs as a home system, but that are visiting the coverage area.

When a call is received for a mobile subscriber, the number of the called subscriber is analyzed in the first contacted MSC (anchor MSC). The identity of the HLR database associated with the called subscriber is then determined by consulting a universal fixed table, that is contained in each MSC, associating each subscriber number with a HLR database. The anchor MSC then signals the called subscriber's HLR database and requests and receives from this HLR a roaming number allowing routing of the received call to the visited MSC in which the called subscriber is presently located.

A problem arising with a UMTS is that because of the large number of UMTS subscribers, a translation between a subscriber number and an associated HLR database is not available in a universal fixed table and not available as general information in all MSCs of the UMTS. When a call is made to a subscriber it is necessary then to locate a node somewhere in the network that can translate the called subscriber's number into location information.

Known proposed techniques of location data management for UMTSs are based on rules that have been defined for the general subscriber. One proposed technique of location data management in a UMTS is based on a hierarchical node structure determined by fixed logical relationships defined by a fixed pointer structure within the system. In this type of hierarchical node structure, the pointer structure is distributed throughout the nodes of the system and each subscriber is assigned the identical pointer structure. The pointer structure comprises a number of logical connections or paths between nodes. In the pointer structure, each of the upper level nodes contains a logical connection to at least one of a number of fixed lower level nodes. Location pointers within the pointer structure in the upper level nodes may be set to point to one of the lower level nodes to which it is logically connected, if it is known that the mobile is located in that lower level node or in a node, along a path of logical connections stemming downward from that lower level node in the hierarchical node structure. Upper level nodes cannot be reconfigured to point to a lower level node that is not logically connected to the upper level node in the location pointer structure.

Tracking the location of subscribers in a UMTS involves the task of location updating. In location updating, databases containing information on subscriber's locations within the system are maintained so that a subscriber may be located when necessary, as, for example, when a call directed toward the subscriber is received in the system. Searching is a related resource intensive task in which the system searches for the location of a called subscriber in one or more of the databases distributed throughout the system that contain location information on the called subscriber.

Database maintenance in a UMTS also includes the task of transferring personalized subscriber data from one database to another as a subscriber moves throughout the system. Personalized subscriber data is a particular type of data that should be located in a database of the system area in which the subscriber is currently located, rather than remain in a home database in the subscriber's original home system area.

Location updating and searches in known UMTS systems are performed along paths defined by the fixed location pointer structure. Because the movement behavior of different mobile subscribers using the system varies and location update and searching requirements will vary from subscriber to subscriber, inefficiencies result from the above discussed fixed location pointer structure. With this type of fixed location pointer structure location updating or searching cannot be optimized for the individual subscriber.

A similar problem exists with existing subscriber data management. In known systems, rules that have been defined for the general subscriber are used to determine the division and transferring of data from one database to another. Subscriber data management also cannot be optimized for the individual subscriber's behavior.

In a universal mobile telephone system the resource intensive tasks of location updating, searching and database management may consume a large portion of available system resources. In a system covering a large geographic area and having a large number of subscribers, these tasks could effect system performance and efficiency. Therefore, a need exists for a method and system of optimizing location updating, searching and/or subscriber data management for individual subscribers within a mobile telephone system.

SUMMARY OF THE INVENTION

The present invention provides a method and system for dynamically managing a subscriber database, preferably in a cellular telecommunications system. The system and method of the invention allows creation of a personalized pointer structure, personalized search list and personalized database for individual mobile subscribers. Use of these personalized features provides an advantage over known mobile systems in which only fixed features of this type, based on general rules, are provided for all subscribers. The inventive personalization of these features for each subscriber reduces the amount of system resources necessary for performing location updating, searching and/or managing subscriber data, as compared to known mobile systems.

The personalized pointer structure is dynamic, being reconfigurable based on the history of the mobile subscriber's movement within the system. Basing the pointer structure configuration on the history of the mobile subscriber's movement reduces the average resources necessary over time to perform location updates as the mobile subscriber moves throughout the system, as compared to known fixed pointer structure systems.

The personalized search list for the mobile subscriber is created based on the history of events associated with the mobile subscriber when initiating calls. When a caller makes a call, the accessed Mobile Services Switching Center (anchor MSC) will search for and find the called subscriber's visitor location register (VLR) database and ask first for a roaming number and, second, for the home location register (HLR) database identity associated with the called subscriber. The anchor MSC will then use this information to route the call and connect the calling subscriber and the called subscriber, but it will also store the database (HLR) identity together with the called subscriber's identity in the personal profile of the calling subscriber. By storing HLR identities of called subscribers in the personal profile of the caller, information on the location of previously called subscribers is made quickly accessible. The use of the personalized search list allows call setup signaling to be directly routed from a caller to the node (called subscriber's HLR) containing information on where the called subscriber is most likely to be located. The search for the called subscriber can then begin in the called subscriber's HLR. This reduces the need to search through the nodes of the system for an initial location pointer to the called subscriber. The personalized search list will reduce the average resources necessary over time to search for called subscribers associated with directory numbers called frequently from an originating subscriber.

The personalized database allows subscriber data to be allocated between nodes of the system according to individual subscriber movement and behavior history. An allocation of subscriber data based on individual subscriber movement and behavior history prevents inefficient use of resources that occurs in known systems where the allocation is performed based on rules for the general subscriber.

In an embodiment of the invention, a dynamically reconfigurable pointer structure is provided within a universal mobile telephone system (UMTS) having a hierarchical node structure. The UMTS comprises a plurality of nodes each assigned to a level i of a plurality of hierarchical levels. The nodes of level i for i=1 each include a data node including one or more base stations controlling a geographic coverage area of the UMTS. The nodes of each level i for i>1 each include a directory node including a database for each mobile subscriber. The database includes at least one reconfigurable logical connection. The logical connection allows at least one location pointer to be set to at least one node of level i−1 that is connected to the level i node in the logical connection. This allows a search for the mobile subscriber to be directed from the level i node to level i−1 nodes logically connected to it.

The reconfigurable logical connections are reconfigured based on information collected on the movement of the mobile subscriber between the coverage areas of the base stations and stored in the mobile subscriber's HLR. In order to reconfigure the logical connections, a probability is calculated from the collected information that indicates the likelihood of the mobile station being located within the coverage area of the base stations controlled by each data node. The logical connections are then reconfigured so that data nodes associated with probabilities in a given range may be pointed to from the same directory node.

The personalized search list of the embodiment is implemented by maintaining a record of called mobile subscriber's directory numbers and HLR node address(es) in the subscriber profile of the mobile subscriber who is the originating subscriber. When a subscriber parameter, F, based on the history of calls from an originating subscriber to a called subscriber exceeds a predetermined value, that called mobile subscriber's directory number and HLR node address(es) are added to the personalized search list stored in the originating subscriber's profile. When the parameter, F, falls below the predetermined value, that called mobile subscriber's directory number and HLR node address(es) are removed from the personalized search list. The parameter F may be calculated as a function of the number of calls made to a called mobile subscriber's number and the time elapsed since the last call to that number. The personalized search list associates each directory number stored within it with the HLR of the called subscriber. Thereafter, when a call is made from the originating mobile subscriber to that directory number, call setup signaling will be directed directly to the HLR associated with the directory number.

The personalized database of the embodiment is implemented by determining the allocation of subscriber data stored within the system according to subscriber behavior. As the subscriber roams within the system, the total subscriber data is distributed between the subscriber database that is permanently stored in the HLR of the subscriber's home system and the temporary subscriber database in the subscriber's VLR of the visited system. The actual data distribution between HLR and VLR may depend on the usage of particular subsets of the data. If the subscriber roams to a new area within the UMTS and it is determined that the subscriber can essentially be considered for all practical purposes as having moved to the visited area, the subscribers's HLR will be transferred to this visited area. The decision to transfer the HLR may be based on collected data that includes calls made to and from the subscriber within the visited area, time of registration within the visited area, the number of location updates within the visited area, and the number of location updates within the home node.

Basing the allocation of data on subscriber movement reduces the average resources over time necessary to locate necessary information as the mobile subscriber moves throughout the system, as compared to the fixed databases of present mobile systems and to presently known approaches to UMTS.

BRIEF DESCRIPTION OF THE DRAWINGS

FIG. 7A illustrates an example of information stored in a personalized search list database according to an embodiment of the invention;

FIG. 8 is a block diagram illustrating a database architecture that may be implemented into a cellular system such as that shown in FIG. 1;

FIGS. 10A and 10B illustrate data records for a mobile subscriber according to an embodiment of the invention;

DETAILED DESCRIPTION

The invention provides a method and apparatus for dynamically reconfiguring a hierarchical location pointer structure for a cellular telecommunications system.

Figure 1A:
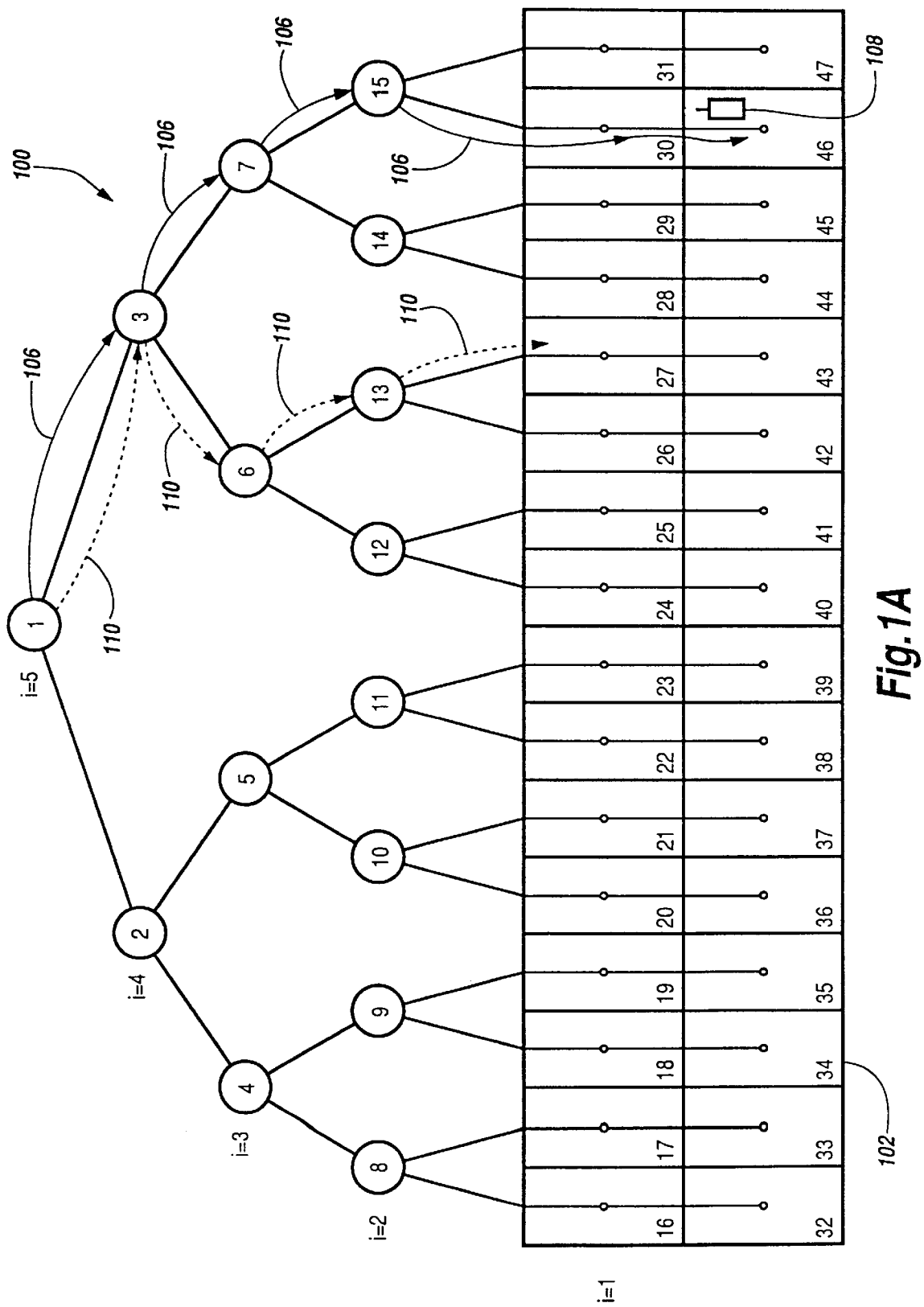
FIGS. 1A and 1B illustrate a hierarchical data structure for a universal mobile telephone system according to an embodiment of the invention.
Figure 1B:
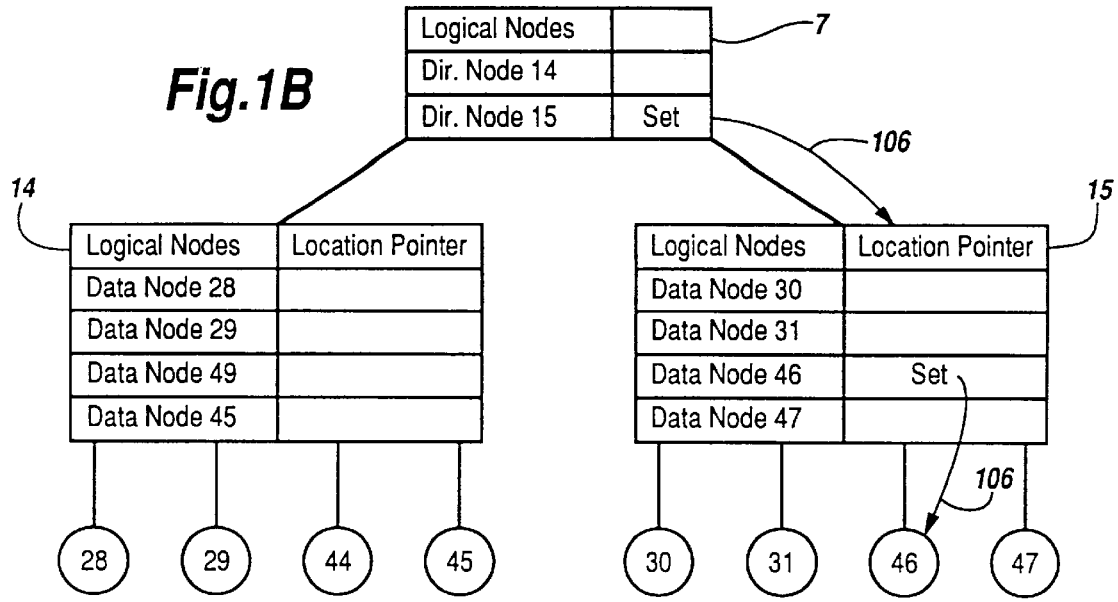

Referring now to FIGS. 1A and 1B, therein is shown a hierarchical structure pointer for a universal mobile telephone system (UMTS) 100 according to an embodiment of the invention. UMTS 100 comprises a plurality of directory nodes 1–15 and a plurality of data nodes 16–47. Directory nodes 1–15 each comprise a switching center having computing and memory means. Data nodes 16–47 each comprise at least one base station and/or at least one mobile switching center (MSC) of a mobile telephone network covering a particular geographic area of UMTS 100. Mobile subscriber 108, using one of a plurality of mobile stations of the system, is shown located in the coverage area of data node 46. While not shown as such, the coverage areas of particular data nodes which are shown to be adjacent to one another in FIG. 1A, may be contiguous.

A mobile user may roam throughout the area covered by data nodes 16–47 while maintaining communications with UMTS 100. The computing and memory means included in each directory node 1–15 comprises means for maintaining a dynamically reconfigurable pointer structure for tracking the location of mobile stations within UMTS 100. In a physical implementation of the invention, directory nodes 1–15 may be located anywhere within the system and any directory node 1–15 or data node 16–47 is capable of communication with any other directory node or data node, as is known in the art. The configuration of the pointer structure, which is shown by the interconnecting lines between directory nodes 1–15 and data nodes 16–47, expresses the logical relationship among location pointer and information items.

Referring now to FIG. 1B, therein is shown the pointer structure within nodes 7, 14 and 15 of FIG. 1A for mobile subscriber 108. The pointer structure contains a database including the identity of at least one lower level node and, a location pointer for each node. The location pointer may be set for only one node of the nodes in the logical node database. In FIG. 1B, a location pointer for mobile subscriber 108 within directory node 7 is set to directory node 15 and a location pointer within directory node 15 is set to data node 46. By setting location pointers in directory nodes 1–15, the location of mobile subscriber 108 can be tracked in the system. The pointer structure allows a location pointer for a particular subscriber stored within a directory node to be set to point to one of the next lower level directory nodes/data nodes logically connected to it in the hierarchy of the pointer structure. For example, if a mobile subscriber 108 is located in the coverage area of data node 46, the location pointers for mobile subscriber 108 are set in each of the directory nodes 1, 3, 7 and 15 to create the path shown by solid lines 106. When an incoming call UMTS 100 is received at directory node 1, the system would locate subscriber 108 by following the path shown by lines 106. If a call were made to mobile subscriber 108 from a data node of data nodes 16–47, the call would be routed upward on the hierarchy through the directory nodes until a location pointer information item was found within a directory node indicating subscriber 108's location. The call would then follow the path downward to subscriber 108.

Data nodes 16–47 are e.g. MSCs and may together include a home location register (HLR) and visitor location register (VLR) for each mobile subscriber of the system. The HLR comprises a permanent database containing data associated with a mobile subscriber and is preferably included within an MSC of the subscriber's home system. The data stored in the HLR is permanent data that is independent of the customer's present location, plus temporary data such as addresses of service centers which have stored short messages for a mobile station. The HLR also contains data used to locate the VLR currently associated with the mobile station. The VLR contains current data for each mobile subscriber visiting within the data node, including that subscriber's mobile station's present or most recently known location within the area of the system covered by the VLR and the mobile station's on/off status. As a subscriber moves from system to system, the VLR data will be transferred to the new VLR so that the VLR data is contained in a VLR of the system in which the subscriber is located.

Each of these VLRs 16–47 also have a pointer to a HLR (not shown), that may be located in any one of the data nodes, for each subscriber, where more infrequently used information of the subscriber is stored and from where it may be obtained by VLRs of visited data nodes when required. There may also be a corresponding return pointer stored in the subscriber's HLR pointing from the HLR to the VLR of the data nodes. However, the HLRs are not involved in the process of locating the subscriber when using the directory node structure of FIG. 1. Because the pointers of the directory nodes point directly downward in the pointer structure toward the visited data node, searching upward as described above without obtaining a pointer to the visited data node from the subscriber's HLR is more efficient. Simulations have shown that this procedure is optimal in the case of subscribers with a low degree of mobility.

In the system of FIGS. 1A and 1B, each mobile subscriber may be assigned a home data node. For example, mobile subscriber 108 may be assigned data node 46 as his/her home node. If mobile subscriber 108 is not registered in the coverage area of a data node other than its home data node 46 or, turned off, the system will locate mobile subscriber 108 from highest node 1 by following location pointers leading through directory nodes 3, 7 and 15 to data node 46. The system will always use this location pointer structure unless mobile subscriber 108 is registered in another area.

When mobile subscriber 108 roams within the geographic area covered by data nodes 16–47, he/she will register with the system to indicate its location in the data node (VLR) in which he/she is currently located. As registration takes place during roaming, the system will update the information items in the pointer structure so that location pointers are available to locate the actual location of mobile subscriber 108 within the system. For example, if mobile subscriber 108 moves from the area covered by data node 46 to the area covered by data node 43, mobile subscriber 108 will be registered within the system as located in data node 43. Information items of the hierarchical pointer structure will then be reconfigured, as allowed by the logical connections of the structure, to allow mobile subscriber 108 to be located within the system. The process of updating the location pointers is known as location updating. This location updating may be done for each crossing of location area borders. In the case where mobile subscriber 108 moves from the coverage area of data node 46 to the coverage area of data node 43, the location pointers for subscriber 108 will be updated within nodes 15, 7, 3, 6, and 13 to define the updated path. In FIG. 1 this is illustrated by the dotted lines 110 which outline the updated path defined by the reconfigured location pointer. The updating involves a total of five directory nodes. If mobile subscriber 108 roams and registers frequently, location updates will be frequent and may include a large amount of system resources.

A fixed conventional pointer structure results in inefficiencies if used in the system of FIGS. 1A and 1B. In the fixed conventional pointer structure, the lower level nodes included in the pointer structure are the same for all mobile subscribers. For example, subscriber 108 may register much more frequently with data node 43 than with data node 47 after leaving the area covered by data node 46. A location update initiated by moving from node 46 to 47 only involves directory node 15 in the updating process. As discussed previously, this involves less system resources than a location update initiated by moving from data node 46 to data node 43, which involves five directory nodes. In the case of subscriber 108 then, reconfiguration of the logical connections in the hierarchical location pointer structure by swapping the location of data node 47 and data node 43 in the hierarchical pointer structure would reduce the average number of nodes involved in location updating for mobile subscriber 108.

An embodiment of the present invention involves implementing a method and system for dynamically reconfiguring the location pointer structure in a hierarchical system, such as UMTS 100, so that the amount of system resources necessary for location updating of location pointer information items is reduced as compared with a fixed hierarchical location pointer structure. The reconfiguration process involves changing the lower level nodes within the pointer structure database by allowing location pointers to be set to different nodes other than a fixed set of nodes. The invention may be implemented by basing the dynamic reconfiguration on mobile subscriber movement history.

Figure 2:
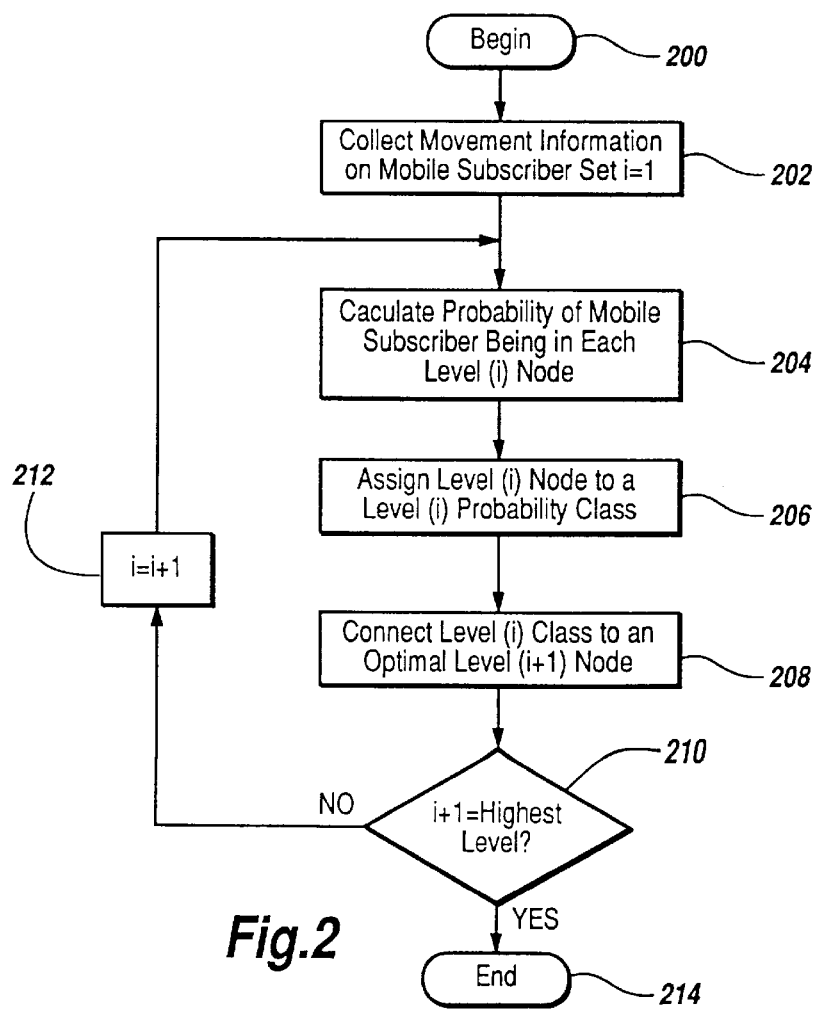
FIG. 2 is a flow diagram illustrating process steps followed within a universal mobile telephone system according to an embodiment of the invention.

Referring now to FIG. 2, therein are illustrated process steps followed for a particular mobile subscriber within UMTS 100 according to one embodiment of the invention when performing the inventive pointer reconfiguration.

When initiated the process begins at Step 202. At Step 202 the process collects information on the movement of the mobile subscriber. The movement information may be collected periodically, over time, and may include information on events associated with the subscriber, for example, information on the data nodes in which the subscriber is located when calls to or from the mobile subscriber are made, or, information on data nodes in which location updates for the mobile subscriber occur.

The point in the network where the collected information is stored may, e.g. be the HLR of the subscriber concerned. The process described in the flow of FIG. 2 may be initiated, e.g. periodically once a month or event driven such as if a subscriber manually enters information that he has permanently moved to another country.

After the movement information is collected, the process moves to Steps 204–210, which are repeated for each level of nodes, including both data and directory nodes, beginning at the lowest level of the hierarchical system. At Step 204 the process calculates a probability of the mobile subscriber being found within each node in the appropriate level when it is necessary to locate the mobile subscriber. The probability is calculated as the probability of the mobile subscriber being found within the coverage area of one of the lower level data nodes covered by that directory node in the hierarchical data structure when it is necessary to locate the mobile subscriber.

Next, at Step 206, the process assigns each node in the level to a probability class. The probability classes each may be defined to include nodes having probabilities, calculated in Step 204, with a certain range. In this way nodes of each level in which the mobile subscriber is equally likely to be found can be grouped together.

Once each node in the level has been assigned a probability class, the process moves to Step 208 where each class is logically connected to a node of the next higher up level in the hierarchical pointer structure by being placed in the pointer structure database of the next higher up node. From Step 208 the process moves to Step 210 where it is determined if the level concerned is the highest level. If a determination is made that the level is the highest level, the process ends at Step 214. If a determination is made that the level is not the highest level, the process returns to Step 204 and Steps 204–210 are successively repeated for the next higher level in the hierarchical location pointer structure until the process is complete for all levels.

Figure 3:
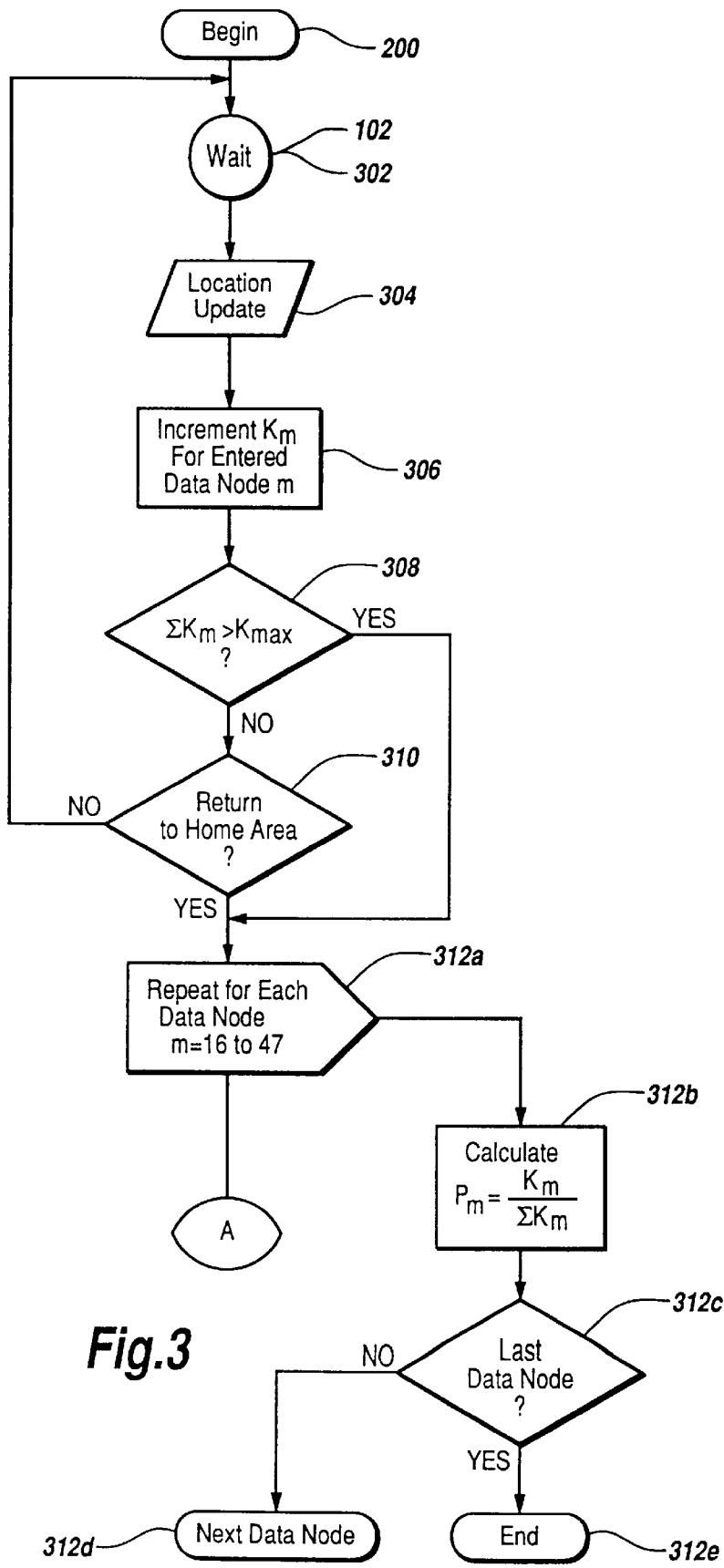
FIG. 3 is a flow diagram illustrating process steps followed when monitoring location updates according to an embodiment of the invention.

Referring now to FIG. 3, therein are illustrated process steps followed when monitoring location updating for a particular subscriber according to one alternative of the embodiment shown in FIG. 2. In the process shown in FIG. 3, each subscriber is assigned a vector k that is stored within the subscriber's profile in the subscriber's HLR. The vector k comprises a data field containing a number of subvectors $k_m$ for each data node m of the system. A particular subvector $k_m$ indicates the number of times a location update has been initiated from data node m. Each time a mobile subscriber registers and the subscriber's location is updated, the HLR increments $k_m$ for the data node m in which the location update was initiated. The subvectors $k_m$ of a particular subscriber are then used as the movement information to reconfigure the location pointer structure for that subscriber. The subvectors $k_m$ are initialized to zero at the initialization of the process of FIG. 3.

The process of FIG. 3 begins at the wait state of Step 302. At Step 302 the process waits for a location update to occur. When any location update occurs, location update information is received at Step 304. The information includes the identity of the data node m within which the location update was initiated. Next, at Step 306 the process increments a vector k[subscript on]m for data node m. After incrementing k[subscript on]m, the process moves to Step 308, where a determination is made as to whether the sum of all the subvectors ($\Sigma k_m$) of the mobile subscriber for all data nodes in the system is greater than a predetermined limit $k_{max}$. The sum $\Sigma k_m$ is the total number of location updates monitored since the most recent monitoring stage was initiated. The limit, $k_{max}$, may be set to provide a desired accuracy in monitoring location updates of a subscriber. The larger $k_{max}$ is set, the longer the period of time and, the larger the sample of location updates monitored.

If, at Step 308, it is determined that the summation $\Sigma k_m$ is greater than the limit $k_{max}$, the process will move to Step 312. However, if it is determined that the summation $\Sigma k_m$ is not greater than the limit $k_{max}$ the process will move to Step 310.

At Step 310 a determination is made as to whether or not the location update took place as the result of the subscriber returning to its home area. If it is determined that the subscriber has returned to its home area, the process moves to Step 312. Otherwise, the process returns to the wait state of Step 302. After returning to the wait state of Step 302, Steps 302, 304, 306, 308 and 310 are repeated until the limit $k_{max}$ is exceeded or until the subscriber returns to its home area. As previously described, in either of these instances, the process will move to Step 312a.

At Step 312a the process repeats Steps 312b–312e and calculates, for each data node m, the probability $P_m$ of a location update being initiated by the mobile subscriber within data node m. $P_m$ is calculated at Step 312b as the number of location updates by the mobile subscriber initiated in data node m, $k_m$, divided by the total number of location updates by the mobile subscriber in all data nodes $\Sigma k_m$. Upon completing the $P_m$ calculation of Step 312a for each data node, the process moves to Step 402 of FIG. 4. The calculated $P_m$ values are then used to reconfigure the location pointer structure.

Figure 4:
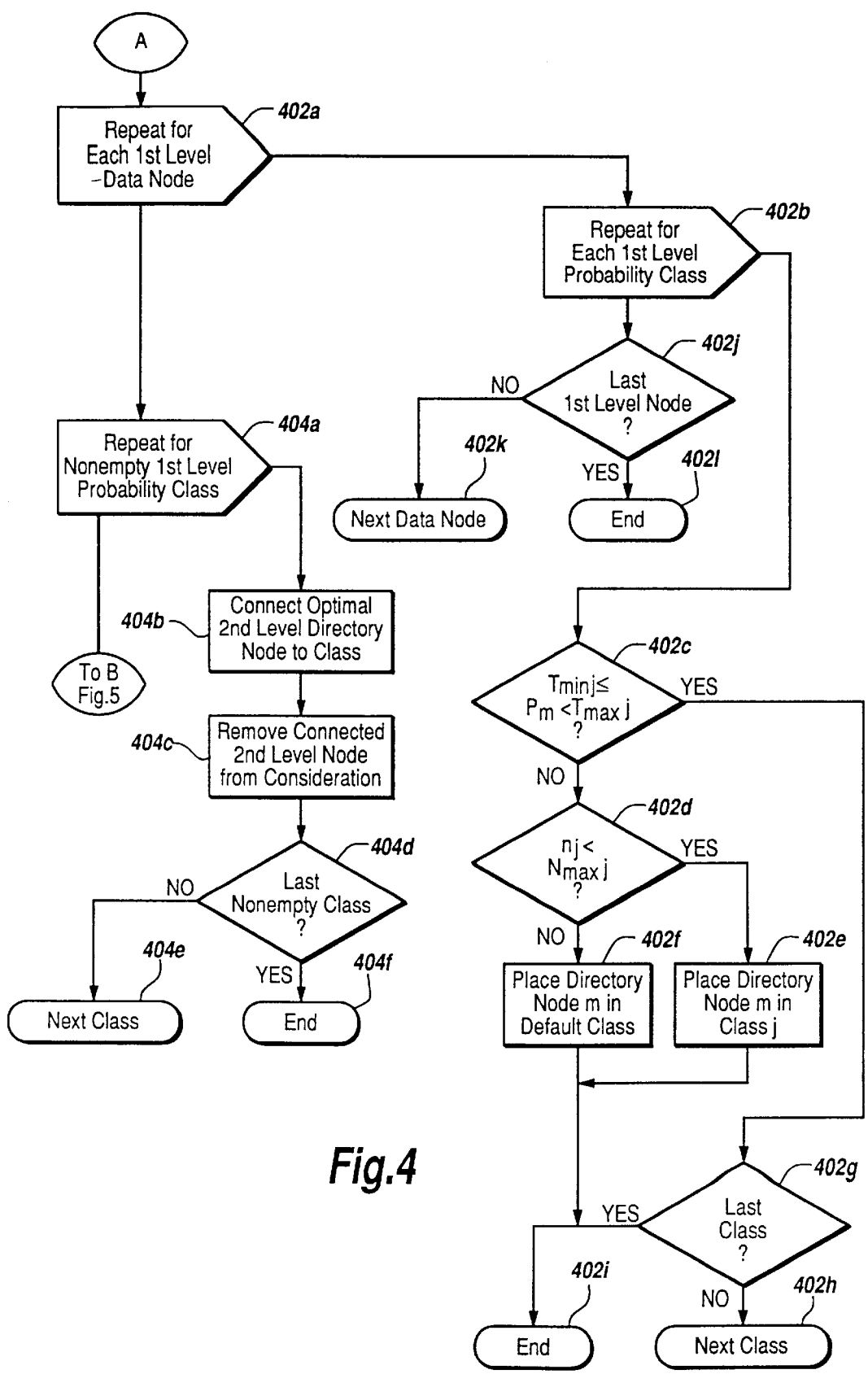
FIG. 4 is a flow diagram illustrating process steps followed when reconfiguring a location pointer structure within second level directory nodes according to an embodiment of the invention.

Referring now to FIG. 4, therein is illustrated a flow diagram showing process steps followed when reconfiguring a location pointer structure within the directory nodes of the second level nodes according to an embodiment of the invention. At Step 402a, Step 402b is performed separately for each data node of the first level nodes. At Step 402b, beginning with first level probability class 1, the process performs Steps 402c–402i for each first level probability class. At Step 402c a determination is made as to whether $P_m$ for the current data node m is within the probability thresholds $T_{min}$ and $T_{max}$ of the current first level probability class. If it is determined that $P_m$ is within the probability thresholds of the class, the process moves to Step 402d. At Step 402d it is determined if the number of data nodes already assigned to the class $n_j$ is less than or equal to the maximum number of data nodes allowed in the class $N_{maxj}$; if it is determined that $n_j$ is less than or equal to $N_{maxj}$, the process moves to Step 402e and the current data node is assigned to the current class. The process then moves from Step 402e to Step 402i where Step 402b is terminated for the current data node. If, however, it is determined that $n_j$ is greater than $N_{maxj}$, the process moves to Step 402f. At Step 402f the data node is placed in the default class for the current class. The default class may be the probability class having the next higher or lower range of $T_{minj}$ to $T_{maxj}$ values. For example, the default class could be determined by checking if the relation $$P_m \geq \frac{T_{minj} + T_{maxj}}{2}$$

is true. If the relation is true, the node would be placed in the next higher range class, otherwise, the node would be placed in the next lower range class.

If, however, at Step 402c a determination is made that $P_m$ is not within the thresholds for the current class, the process moves to Step 402g where it is determined if the current class is the last class for which Step 402b is to be repeated. If it is determined that the current class is the last class for which Step 402b is to be repeated, the process of Step 402b ends at Step 402i. If the current class is not the last class, the process moves to Step 402h and Step 402b is repeated for the next class.

After completing Step 402b for the current data node, the process moves to Step 402j where a determination is made as to whether Step 402a has been completed for all data nodes. If a determination is made that Step 402a has been completed for each data node, the process of Step 402a will move to Step 402l and end. If, however, a determination is made that Step 402a has not been performed for each data node, the process will move to Step 402k and repeat for the next remaining data node.

After completing Step 402a, a first level probability class has been assigned to each first level data node and the process moves to Step 404a. Step 404a comprises Steps 404b–404f, which are repeated for each probability class that contains at least one data node. At Step 404b the directory node(higher level node) optimal for connection to the current first level probability class is chosen from the directory nodes in level two of the system hierarchy. The optimal higher level node for a probability class is the higher level node that makes most efficient use of system resources, as compared to the available higher level nodes, when connected to the probability class. For example, the optimal node may be chosen as the higher level node that when connected to the nodes of the probability class provides the smallest summation of the total distance of all data links connecting the higher level node and the nodes of the probability class. Another example would be to choose the optimal node as the higher level node that has the most resources available, i.e., a higher level node that carries the least amount of system traffic as compared to other directory nodes of the same level. The chosen second level directory node is then logically connected to the nodes of the first level probability class in the location pointer structure by reconfiguring the pointer structure database of the chosen second level directory node to contain the identities of the nodes of the first level probability class.

Next, at Step 404c, the chosen directory node is removed from the list of second level directory nodes that may be chosen from in Step 404b. Steps 404b, 404c and 404d are then repeated until all first level probability classes containing at least one data node are connected to a second level directory node.

When the process of FIG. 4 is completed, the system data nodes in the first level are each connected to a directory node of the second level directory nodes in a location pointer structure configuration that takes the history of subscriber movement into account.

After the location pointer structure reconfiguration process is completed for FIG. 4, the reconfiguration process begins reconfiguring the location pointer structure for the next level of nodes.

Figure 5:
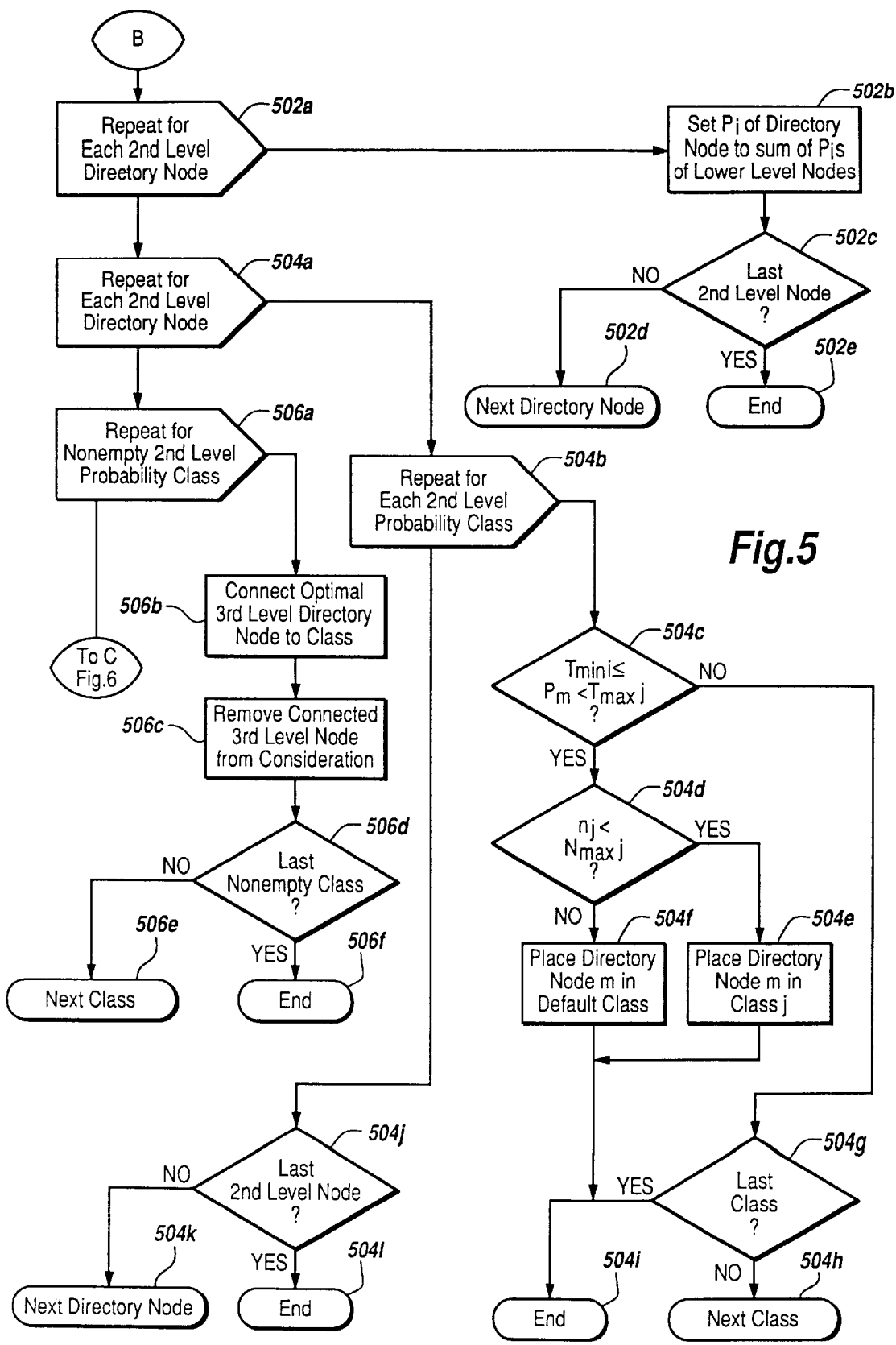
FIG. 5 is a flow diagram illustrating process steps followed when reconfiguring a location pointer structure within third level directory nodes according to an embodiment of the invention.

Referring now to FIG. 5, therein is shown a flow diagram illustrating process steps followed when reconfiguring a location pointer structure within third level nodes according to an embodiment of the invention.

At Step 502a the process repeats Steps 502b to 502e for each second level directory node, in order to assign each of the second level directory nodes a probability $P_m$. At Step 502b $P_m$ for the current second level directory node is set equal to the sum of probabilities $\Sigma Pms$ of all data nodes that have been connected to that directory node in the process of FIG. 4. Step 502b is repeated for each second level directory node by performing Steps 502c, 502d and 502e until a probability Pi is set for all second level directory nodes. The probability $P_m$ assigned to each second level directory node indicates the probability of a location update being initiated within a data node logically connected to that directory node in the hierarchical location pointer structure.

After performing Step 502a, the process moves to Step 504a. At Step 504a the process repeats Steps 504b–m, in order to assign each second level directory node to a second level probability class. Steps 504b to 504l are performed in a manner analogous to the way Steps 402b–l of FIG. 4 are performed when assigning data nodes to a first level probability class.

After assigning each second level directory node to a second level probability class, the process moves to Step 506a. At Step 506a the process repeats Steps 506b to 506f, to logically connect one optimal third level directory node to the second level directory nodes in each second level probability class by reconfiguring the pointer structure database of the optimal third level directory node to contain the identities of the nodes of each second level probability class. Steps 506a to 506f are performed in a manner analogous to the way Steps 404a to 404f of FIG. 4 are performed.

Once the location pointer structure reconfiguration of FIG. 5 is completed, the reconfiguration process begins reconfiguring the location pointer structure for the next level of directory nodes.

Figure 6:
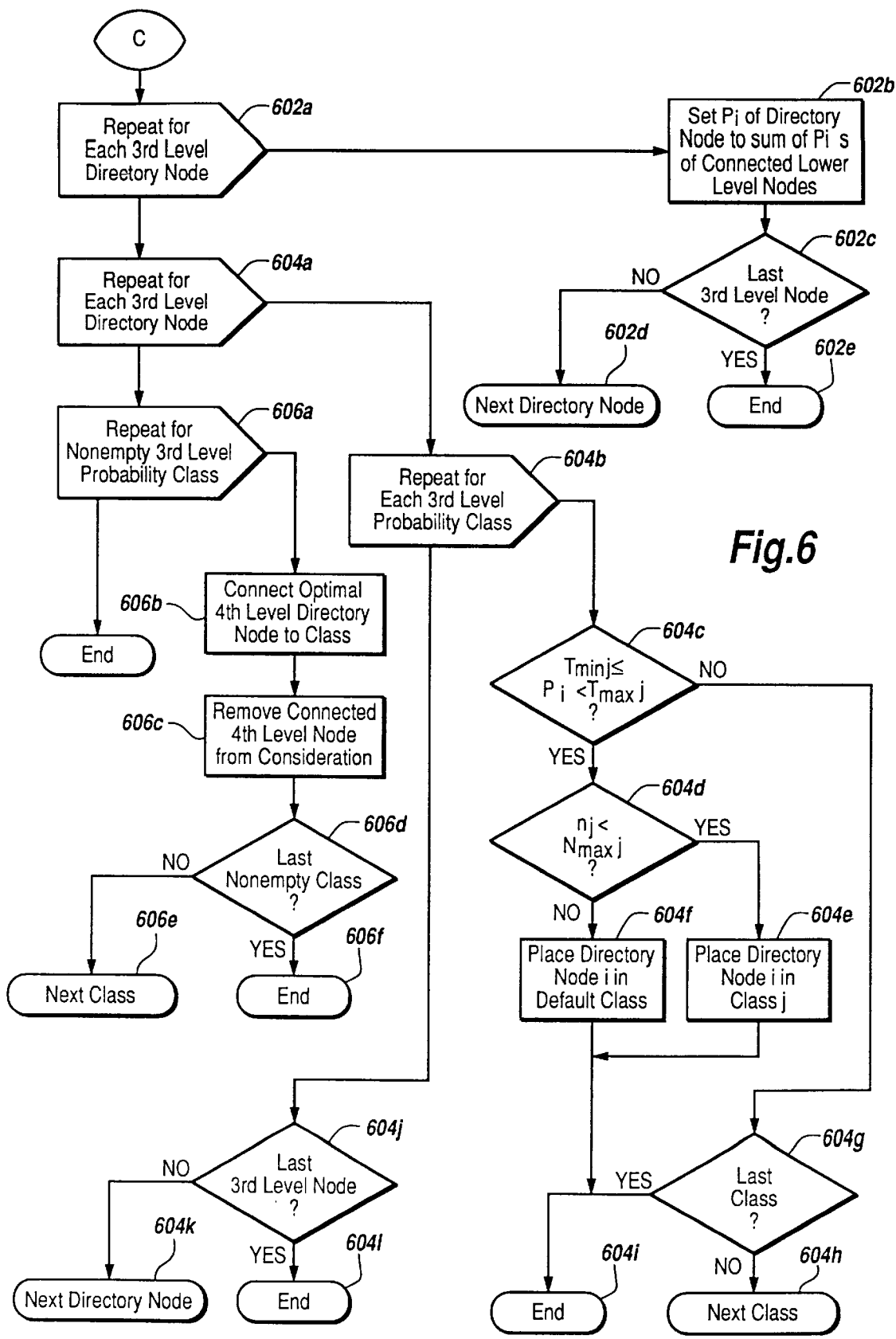
FIG. 6 is a flow diagram illustrating process steps followed when reconfiguring a location pointer structure within fourth level directory nodes according to an embodiment of the invention.

Referring now to FIG. 6 therein is shown a flow diagram illustrating process steps followed when reconfiguring a location pointer structure within fourth level directory nodes according to an embodiment of the invention.

At Step 602a the process repeats Steps 602b to 602e for each third level directory node, in order to assign each of the third level directory nodes a probability $P_m$. At Step 602b $P_m$ for current level directory node is set equal to the sum of probabilities $\Sigma Pms$ of all second level directory nodes connected to that third level directory node. Step 602b is repeated for each third level directory node by performing Steps 602c, 602d and 602e until a probability $P_m$ is set for all third level directory nodes. The probability $P_m$ assigned to each third level directory node indicates the probability of a location update being initiated within a data node logically connected to second level directory node that is logically connected to the third level directory node by the hierarchical location pointer structure.

After performing Step 602a, the process moves to Step 604a. At Step 604a the process repeats Steps 604b to 604l, in order to assign each third level directory node to a third level probability class. Steps 604b to 604l are performed in a manner analogous to the way Steps 402b–l of FIG. 4 are performed when assigning data nodes to a first level probability class.

After assigning each third level directory node to a third level probability class the process moves to Step 606a. At Step 606a the process repeats Steps 606b to 606f, to logically connect one optimal fourth level directory node to the third level directory nodes in each third level probability class by reconfiguring the pointer structure database of the optimal fourth level directory node to contain the identities of the nodes of each third level probability class. Steps 606a to 606f are performed in a manner analogous to the way Steps 404a to 404f of FIG. 4 are performed.

When the process of FIG. 6 is completed, the subscriber location pointer structure connects each third level directory node to a fourth level directory node in a location pointer structure configuration that takes the history of the subscriber's movement into account.

The process is repeated for each upper directory node level, as shown in FIGS. 5 and 6, until all data information items for the subscriber stored within directory nodes in all levels of the system are reconfigured. The result will be a hierarchical location pointer structure that is configured at all levels to take subscriber movement into account.

The hierarchical location pointer structure can be used in conjunction with the personalized search list function of the invention. In the personalized search list aspect of the embodiment of the invention, a personalized search list is kept in the subscriber profile stored in the subscriber profile in the VLR of each mobile subscriber.

Referring now to FIG. 7A, therein is illustrated an example of information stored in a database used to create a personalized search list. The personalized search list is a part of the subscriber's profile and is placed in the subscriber's database in the VLR of the data node in which the mobile subscriber is currently located. The personalized search list is used by the subscriber when he/she is the originating (i.e., calling) subscriber. For each called subscriber X, the information includes a directory number ($No._x$), a call count value ($Calls_x$), a last call time value ($Time_x$) and a data node address ($DN_x$) for the home location of the called subscriber. The database may contain any number of called subscribers or, for example, subscribers called over a certain time period, such as the last year.

Figure 7B:
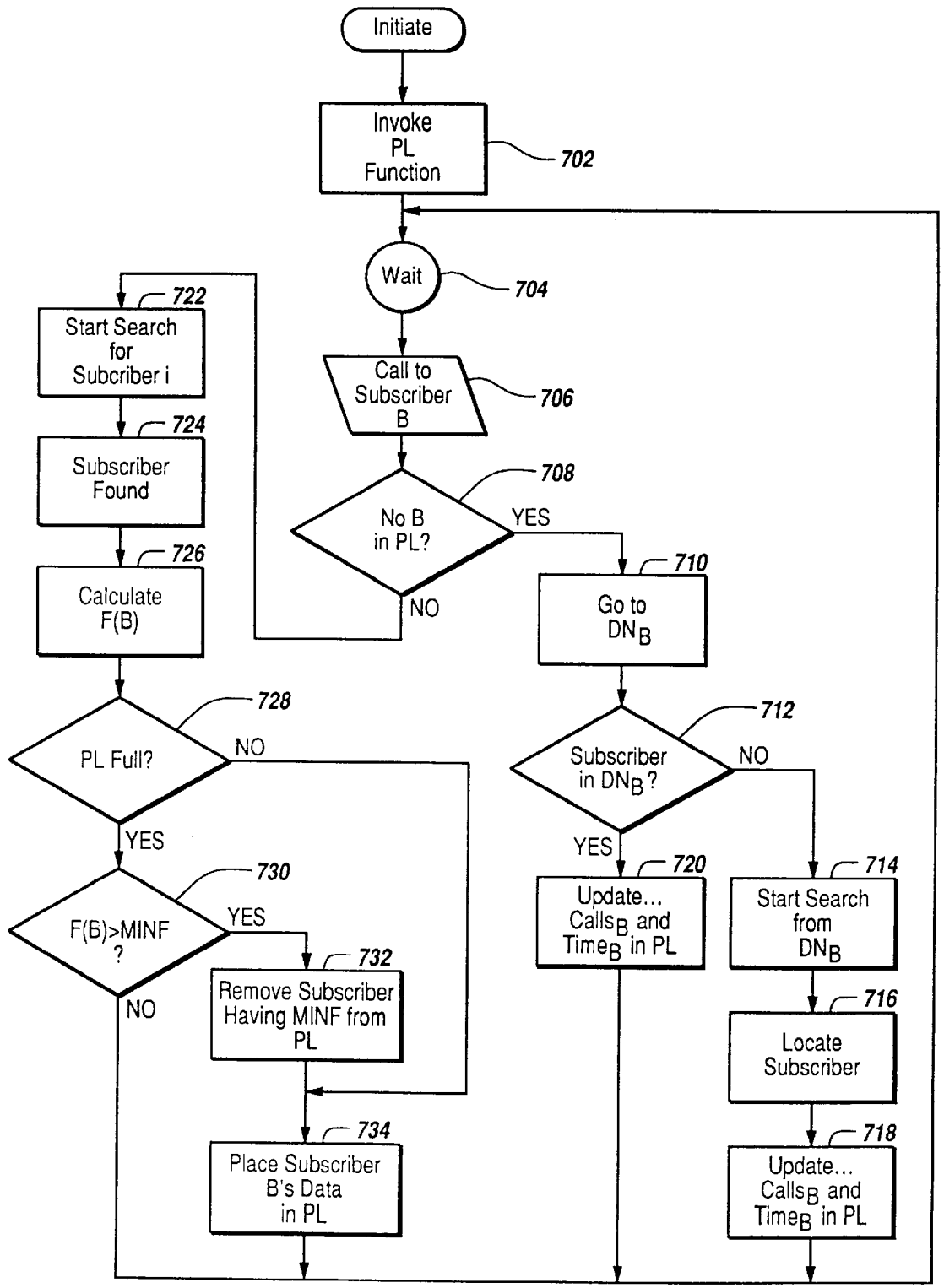
FIG. 7B is a flow diagram illustrating process steps followed when creating a personalized search list according to an embodiment of the invention.

Referring now to FIG. 7B, therein is shown a flow diagram illustrating process steps followed when creating a personalized search list for an originating subscriber according to an embodiment of the invention. After initiation, the process moves to Step 702 where the personalized search list (PL) function is invoked. From Step 702 the process moves to the wait state of Step 704 where the process waits to receive an input indicating that a call to a subscriber has occurred.

At Step 706 an input is received indicating a call has been made to a subscriber B. Next, at Step 708, a determination is made as to whether subscriber B's directory number ($No._B$) is in the personalized search list. If it is determined that $No._B$ is stored in the personalized list, the process moves to Step 710. At Step 710 the process directs the search to the home node of subscriber B ($DN_B$). Next, at Step 712, a determination is made as to whether the home (HLR) of subscriber B is located in $DN_B$. If it is determined that the home (HLR) of subscriber B is not located in $DN_B$, the process moves to Step 714 where the process searches the system nodes for the location of subscriber B. At Step 716 subscriber B is located. The process then moves to Step 718 where $Call_B$, $Time_B$ and $DN_B$ are updated for the called number in the personalized search list of the originating subscriber. The process then moves back to the wait state of Step 704. If, however, at Step 712, it is determined that subscriber B is located in $DN_B$, the process moves to Step 720. At Step 720 $Call_B$, $Time_B$ and $DN_B$ are updated in the personalized search list of the originating subscriber. The process then moves back to the wait state of Step 704.

If, however, at Step 708, it is determined that $No._B$ is not in the personalized search list, the process moves to Step 722. At Step 722 the process starts the search for subscriber B from the originating subscriber's data node location. At Step 724 subscriber B is found. Next, at Step 726 the process calculates a value F(B). F(B) is calculated as follows:

$$F(B) = X(\text{No of calls to } B) - Y(\text{Present Time} - \text{Time of Last Call to Subscriber } B)$$

where X and Y are constants set by the system operator. If this is the first call to subscriber B, F(B) will be equal to X.

After calculating F(B), the process moves to Step 728 where it is determined if the personal list is full. If it is determined that it is full, the process moves to Step 730. In Step 730, it is determined if F(B) is greater than MINF. MINF is determined as the minimum value of F(x), as calculated for all subscriber numbers X in the personalized search list. If it is determined that F(B) is less than or equal to MINF, the process moves back to the wait state of Step 704. If, however, at Step 730, it is determined that F(B) is greater than MINF, the process moves to Step 732. At Step 732 the subscriber in the personalized search list associated with MINF is deleted from the personalized search list. Next, at Step 734, the personalized search list data of subscriber B, No.$_B$, DN$_B$, Calls$_B$ and Time$_B$ is added to the personalized search list. If, however, at Step 728, it is determined that PL is not full, the process moves directly to Step 739.

When a call is made to a subscriber number that is included in the personalized search list, the data node from which the call is made will direct call setup signaling directly to the home data node address associated with the subscriber in the personalized search list. The search for the subscriber will then start in his home data node. Having this node address available reduces the need to search upward through the hierarchical pointer structure of the called subscriber. For example, referring to FIG. 1A, if an originating mobile subscriber having a personalized search list and located in the coverage area of data node 32 directs a call to mobile subscriber 108 and mobile subscriber 108's data node number is contained in the originating subscriber's personalized search list, the call will be initially directed to data node 46 and the search will begin from data node 46. In this example it is not necessary to then search each of data nodes 8, 4, 2, 1, 3, 7 and 15 for a pointer to be able to locate mobile subscriber 108 in home data node 46 as would be done without the personalized search list when a call is made from data node 32. By directing call setup signaling immediately to the home data node, any directory nodes which would have been necessary to search in order to reach the home data node, are removed from the search list. The search can then begin within the home data node.

The personalized search list function is particularly effective when the location pointer structure for called subscribers has been reconfigured by the process illustrated in FIGS. 2–6. In this case, because data nodes that the called subscriber is most likely to be located in (those in which a location update is most likely to occur and including the home node) are logically connected to directory nodes that are closely located to one another in the hierarchical location pointer structure, the search of the called subscriber will begin in a data node closely located to the home node of the called subscriber. The called subscriber's home node (HLR) has information on the most probable nodes in which to find the called subscriber. This information will be used to search the called subscriber, first in the most probable node, then in the next most probable node, as described earlier.

The personalized database function of the embodiment of the invention involves optimizing the location of the HLR for a particular mobile subscriber as the mobile subscriber moves throughout the system.

Referring now to FIG. 8, therein is illustrated a database architecture of a portion of UMTS 100 of FIG. 1. FIG. 8 shows directory nodes 1, 4, 7 and 15 of FIG. 1, and data nodes 45, 46 and 47. The data nodes include two types of mobile subscriber registers, a home location register (HLR) and a visitor location register (VLR).

As previously described, each mobile subscriber is assigned a data node as a home node. The home node assigned to a particular mobile subscriber contains the HLR data for that subscriber within the HLR. The HLR of that data node may be then defined as the HLR of that particular subscriber. The HLR for a mobile subscriber is considered a permanent record for the subscriber. As the subscriber roams about the system and operates in different data nodes, subscriber data related to that mobile subscriber, and necessary for system operation, is transferred to the VLR of the visited data node in which the mobile subscriber is operating. The data that is transferred to the VLR of a visited node is only used temporarily while the subscriber operates in the visited node. As the subscriber roams throughout the system and operates in different visited data nodes, the VLR holding the temporary subscriber data changes identity.

The personalized database aspect of the embodiment of the invention involves monitoring the behavior of a particular mobile subscriber over time and then reconfiguring the location of the subscriber's HLR based on the subscriber's behavior by relocating the subscriber HLR data to a different HLR. The division and allocation of subscriber data between the subscriber's HLR and the VLR of a visited node may also be based on the subscriber's behavior in this embodiment of the invention.

As an example, mobile subscriber 108 who is assigned data node 46 as a home node may change his behavior, because of a change in domicile or for some other reason, so that mobile subscriber 108 no longer will be physically present in the coverage area of the base stations controlled by data node 46 for any effective period of time. It may be that mobile subscriber 108 changes behavior so that during the largest portion of the time he is located in the coverage area of data node 47. In this case the personalized data base aspect of the invention will act to transfer mobile subscriber 108's HLR data from data node 46 to data node 47 and effectively relocate mobile subscriber 108's HLR from data node 46 to data node 47.

Figure 9:
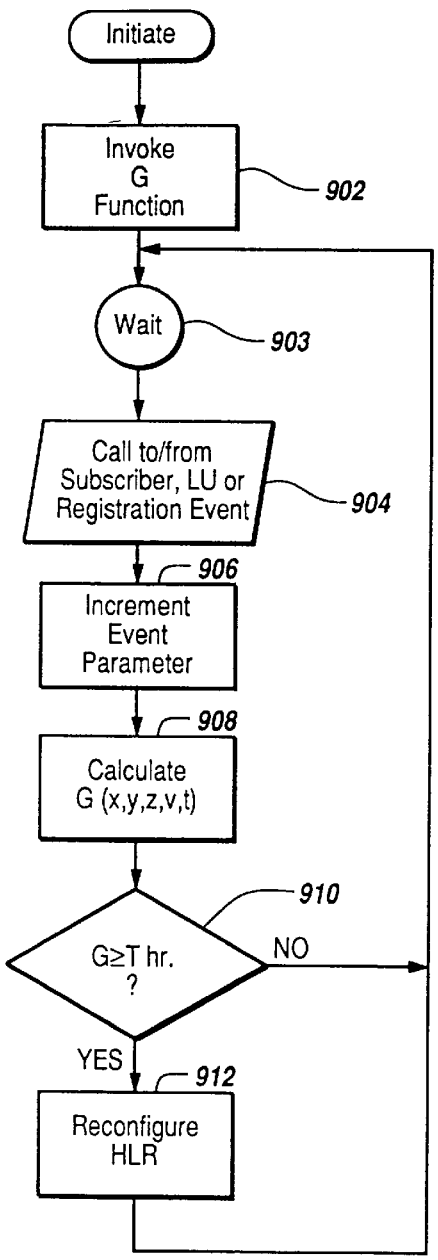
FIG. 9 is a flow diagram illustrating process steps followed when a mobile subscriber's HLR is reconfigured according to an embodiment of the invention.

Referring now to FIG. 9, therein is shown a flow diagram illustrating process steps followed when a mobile subscriber's HLR is reconfigured by changing its location according to an embodiment of the invention. After initiation the process moves to the wait state of Step 902 where the HLR reconfiguration function G is invoked. Next, at Step 904 the process receives an input indicating a call to/from the mobile subscriber, a location update (LU) by the mobile subscriber, or a registration event by the subscriber. At Step 906 it is then determined which event occurred and an event parameter associated with that event is incremented. The HLR reconfiguration function uses the following event parameters:

$x_n$=number of incoming calls in node n.

$y_n$=number of outgoing calls in node n.

$z_n$=number of location updates in node n.

v=number of location updates in HLR.

$t_n$=time of first registration in node n.

Next, the process moves to Step 908 where a parameter $G_n$, where n indicates the current data node is updated. $G_n$ is calculated as the value of the function $G(x_n,y_n,z_n,v,t_n)$. Each variable of $G_n$ is initialized to zero each time the process of FIG. 9 is initiated, and is determined and stored within a database in the mobile subscriber's HLR as events occur.

Next, at Step 910, it is determined if the calculated value of $G_n$ for the subscriber is equal to or greater than a predetermined threshold. The threshold value is set as desired by the system operator so that when it is found that a certain number of events related to the mobile subscriber occur within the current data node, that data node may be reconfigured as the HLR of the mobile subscriber. For example, the threshold value may be set to 1 and $G(x_n,y_n,z_n,v,t_n)$ may be defined as follows:

$G_n=1$, if $x_n>20$, or $y_n>20$, or $z_n>2v$, or (Time now-$T_n$)>2 months

If it is determined that $G_n$ is equal to or greater than the threshold value, the process moves to Step 912. At Step 912 the HLR of the mobile subscriber is reconfigured by moving the HLR data of the mobile subscriber to the current data node. If, however, at Step 910, it is found that $G_n$ is not above the threshold value, the process returns to the wait state of Step 903.

The determination as to what specific subscriber data is transferred between the HLR of a subscriber's home data node and the VLRs of visited nodes as the mobile subscriber roams throughout visited nodes may also be made based by gathering data on the behavior of the mobile subscriber.

Referring now to FIGS. 10A and 10B, therein are shown data records for a mobile subscriber (subscriber A) according to an embodiment of the invention. FIG. 10A illustrates data records contained in the HLR (HLRA) of the home data node of subscriber A when subscriber A is operating within the home data node. In this case, HLRA is accessed when data on subscriber A is needed. HLRA contains data records $DR_1$–$DR_N$ each associated with a parameter $R_1$–$R_N$, respectively. HLRA also contains temporary data (Temp data) that is necessary for control. Each parameter $R_1$–$R_N$ is an indicator of the frequency of usage of the data record with which it is associated. Each time a data record $DR_K$ is accessed for use, its associated parameter $R_K$ may be incremented in value. The value of $R_K$ may then be used to determine whether $DR_K$ should be transferred to the VLR of a visited node as subscriber A roams about the system. A threshold value $T_R$ may be set and when $R_K$ is determined to be greater than $T_R$ over a predetermined period of time, the data record $DR_K$ will then be transferred to the VLR of the data nodes in which subscriber A visits while roaming. A new determination of $R_K$ for each data record may be made periodically.

FIG. 10B illustrates the data record contained in HLRA and the VLR of a visited node (VLRA) in which subscriber A is roaming. In FIG. 10B, only data records $DR_2$, $DR_3$ and $DR_{N-1}$ have been transferred to VLRA. $DR_2$, $DR_3$ and $DR_{N-1}$ are each associated with the appropriate parameter $R_2$, $R_3$ and $R_{N-1}$. In this case determination to transfer $DR_2$, $DR_3$ and $DR_{N-1}$ to VLRA was based on a determination that $R_2$, $R_3$ and $R_{N-1}$ were found to be greater than $T_R$ for subscriber A over a predetermined period of time.

The personalized database will reduce overall system data traffic in a UMTS such as that shown in FIG. 1. For example, the threshold may be set so that when it is found that over 90% of the events related to a mobile subscriber occur in a certain node, that node will become the home node of the subscriber. In this case, use of the invention would prevent the need for the system to route a large number of calls through the fixed home node, when the subscriber is more likely to be located in a node other than its assigned home node. Additionally, basing the allocation of subscriber data between a subscriber's HLR and VLRs of visited nodes on subscriber behavior, reduces data traffic necessary to access frequently used subscriber data across many nodes.

Figure 11:
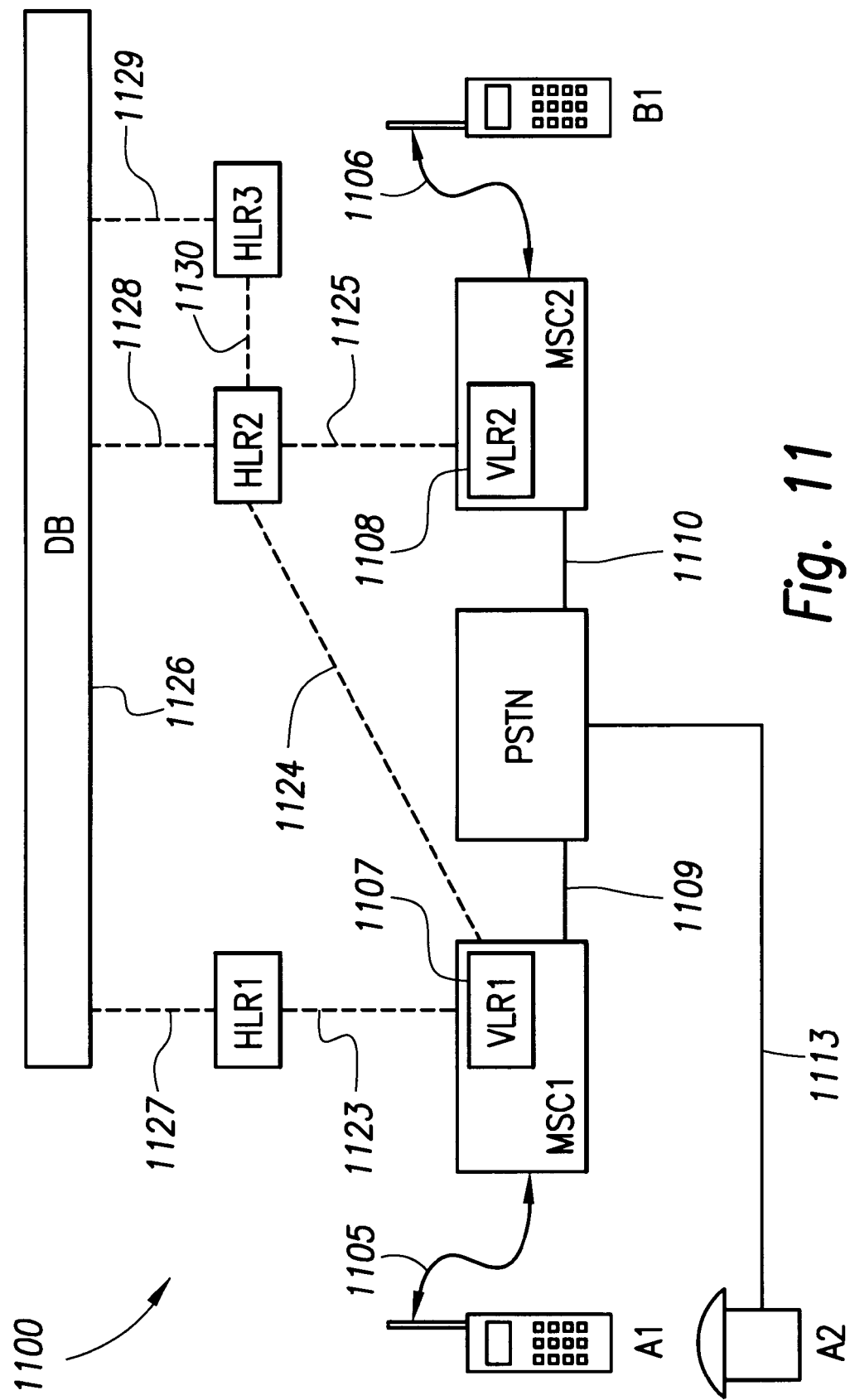
FIG. 11 illustrates a call scenario according to an embodiment of the present invention.

Referring now to FIG. 11, therein is illustrated a portion of a cellular system 1100 into which the embodiment of the present invention is implemented. Cellular system 1100 includes home location registers (HLRs) HLR1, HLR2 and HLR3, mobile switching centers (MSCs) MSC1 and MSC2, database (DB) 1126, mobile station (A1) and mobile station (B1), MSC1 and MSC2 interface to the public switched telephone network (PSTN). PSTN includes fixed terminal (A2).

FIG. 11 may be used to illustrate the situation in which a call is made from mobile station A1 to mobile station B1, where B1 has been assigned a UMTS telephone number, i.e., a telephone number not associated with a particular HLR. In FIG. 11, location information associated with the subscriber may be found in any HLR. The mobile stations A1 and B1 communicate with the respective nearest Mobile Services Switching Center MSC1 and MSC2 via radio base stations (not shown) over the radio connections 1105 and 1106, respectively. MSC1 and MSC2 include visitor location registers VLR1 and VLR2, respectively, and they communicate with each other via the connections 1109 and 1110 through the Public Switched Telephone Network PSTN. Fixed terminal A2 is connected to PSTN via subscriber line 1113. Mobile station A1 may be any type of cellular mobile radio terminal that has access to mobile radio land system 1100. In FIG. 11, the connections drawn with full lines (1109, 1110 and 1113) are for subscriber to subscriber user traffic, i.e., switched voice and data connections, whereas the connections drawn with dotted lines (1123, 1124, 1125, 1127, 1128 and 1129) are data connections supporting the setting up of subscriber to subscriber user traffic, preferably employing packets of data for communication between nodes.

Home Location Registers HLR1, HLR2 and HLR3 are located in geographical locations at a great distance from each other and serve each a large number of subscribers as, e.g. 100,000. In the personalized search list and database aspect of the system level embodiment, the subscriber data of the UMTS subscribers stored in each HLR are no longer associated in a fixed way with the HLR as it is in conventional cellular mobile radio systems. Instead, the UMTS subscriber records may be moved between the HLRs when a subscriber changes his/her domicile or changes communication habits, in order for the subscriber to have data associated with him/her available in the average at a nearby location in order to reduce signaling cost and average call setup time.

In an embodiment of the invention, HLR data is moved from one HLR to another when an evaluation algorithm indicates that movement for a new HLR is necessary. The evaluation algorithm statistically compares and evaluates the amount of traffic that the considered subscriber is associated with in each MSC. The fixed Data Base 1126 is also updated when the HLR data of a certain subscriber is moved to provide a pointer in Data Base 1126 to the new HLR of the subscriber. Hardware and software necessary for performing the algorithm and providing the functions of moving data and updating the Data Base 1126 may be included in the HLR of the home data node of the subscriber.

Each of MSC1, MSC2 and MSC3 of cellular mobile radio system 1100 may communicate with any of HLR1, HLR2 and HLR3 as indicated by the data links 1123, 1124 and 1125. Fixed Data Base (DB) 1126 serves as a number catalog for HLR1, HLR2 and HLR3, which are connected to the fixed Data Base 1126 via data links 1127, 1129 and 1129. It is also possible to communicate directly between HLRs via a data link in order to transfer data of a certain subscriber when the above named algorithm of the assigned home data node has decided that the data is to be moved to a new HLR in a different data node.

Figure 12:
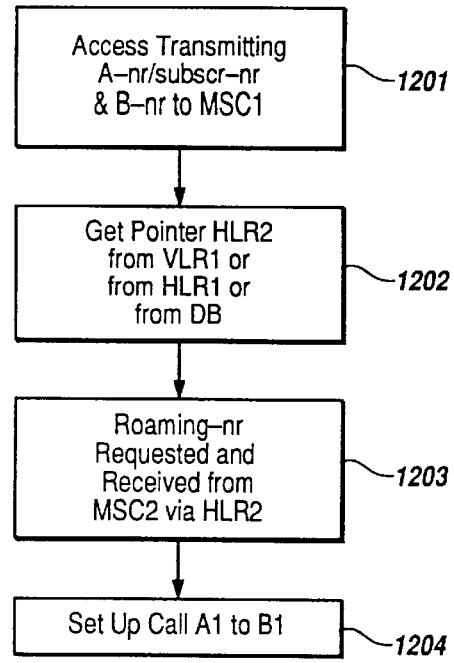
FIG. 12 is a flow diagram illustrating process steps followed by the personalized database function according to an embodiment of the invention.

Referring now to FIG. 12, therein are shown process steps followed by the personalized search list function according to an embodiment of the invention.

FIG. 12 shows the flow of events when a call is made from mobile station A1 (subscriber A) to mobile station B1 (subscriber B) and the personalized search list is used. At Step 1201, mobile station A1 accesses MSC1 via radio connection 1105. The identity and subscription number of mobile station A1 is received by MSC1 together with the dialed subscription number of mobile station B1 (B-number) indicating that a connection is requested to UMTS mobile station B1. At Step 1202, since the B-number is recognized by MSC1 to be a UMTS terminal number, MSC1 asks VLR1 whether the dialed B-number is among the numbers registered in the personalized search list of the personal profile of the subscriber associated with mobile station A1 (subscriber A) each of which has associated with it an HLR identity that shows which HLR is the home data node of subscriber B. The personalized search list may be created by the process shown in FIG. 7B. If VLR1 contains this information, VLR1 informs MSC1 that subscriber B is included in the personalized search list and that HLR2 is the node associated in the personalized search list with subscriber B. If VLR1 does not contain this information, it checks subscriber A's personal profile to determine that the identity of subscriber A's HLR is HLR1 and sends this information to MSC1. Next, MSC1 asks HLR1 for the B-subscriber's HLR-identity (HLR2). If the information is stored in HLR1 the information is provided to MSC1, if not, HLR1 requests and obtains the information from fixed Data Base 1126 before forwarding it to MSC1. When Step 1202 is completed, MSC1 knows that the B-subscriber's HLR is HLR2 and the remainder of the call setup procedure is performed as in conventional systems, i.e., in Step 1203 MSC1 asks HLR2 via connection 1124 for a roaming number to the mobile station B1 and receives the roaming number from MSC2 via connection 1125 and HLR2, as known to those of ordinary skill in the art. Then, at Step 1204, the call from subscriber A to subscriber B is completed. If a fixed terminal A2 is used for originating the call, the procedure of setting up the call to the called terminal B1 is the same except that the access to MSC1 is via the PSTN and fixed terminal A2 does not have a personal profile in the cellular mobile radio system and therefore, information on where the B-subscriber's HLR is, i.e., HLR2, must be obtained by MSC1 from the fixed DB.

Figure 13:
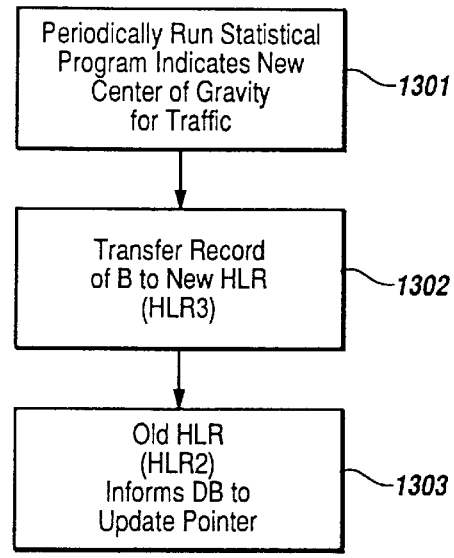
FIG. 13 is a flow diagram illustrating process steps followed by the personalized search list function according to an embodiment of the invention.

FIG. 13 shows the flow of the personalized database function that moves a subscriber's HLR records from HLR2 to HLR3 and updates fixed Data Base 1126 regarding where to find the subscriber's HLR. Note that the term HLR in FIG. 13 refers to a node having both location data and other data associated with a particular subscriber as is the case in traditional HLRs. In the embodiment of FIG. 11 an HLR is always contacted when a subscriber having its record in this HLR is involved in a terminating call. One way of collecting statistics for the whereabouts of a subscriber is to record the terminating traffic MSCs of calls and the duration of the calls. Another way of collecting statistics is to have MSCs report traffic data to the HLR of a particular subscriber regarding originating traffic by the subscriber. The reporting of data may be done as shown in the flow diagram of FIG. 9.

As an alternative, the reporting of data does not need to be performed for each call but may be statistics that are accumulated for each subscriber over a certain time, e.g., one week. Each HLR may then run a statistical program once a week considering the past month and investigating whether the HLR data of a particular subscriber should be moved to a different HLR. Criteria for moving may be that the geographical center of traffic has moved away from the present HLR by at least a minimum number of km, e.g., 100 km, and that there is an HLR nearer to the new center of traffic than the present HLR. The center of traffic may be calculated according to a known formula whereby a weight factor is applied to each MSC proportional to the traffic associated with the MSC. The flow is as follows. FIG. 13 illustrates the process steps performed in this alternative embodiment. At Step 1301 HLR2 runs a statistical program showing that a particular subscriber number associated with mobile station B1 (subscriber B) has a new center of traffic remote from a previous center of traffic by a distance that exceeds a predetermined limit by considering the terminating points of calls made to the subscriber. In Step 1302, HLR2 transfers the record of subscriber B from HLR2 to HLR3 which is the HLR nearest to the new point of gravity of the terminating traffic via a data link 1130. In Step 1303, HLR2 informs the fixed DB 1126 over data link 1128 to change the pointer for subscriber B to point to HLR3 over data link 1129 instead of HLR2 over data link 1128.

It is believed that the operation and construction of the present invention will be apparent from the foregoing description and, while the invention shown has been characterized as a particular embodiment, changes and modifications may be made therein without departing from the spirit and scope of the invention as defined in the following claims.

What is claimed is:

1. In a telecommunications system comprising a plurality of mobile stations and a plurality of data nodes, each of said data nodes including at least one base station having a coverage area, and wherein each of said plurality of mobile stations is capable of making calls to and receiving calls from one of a plurality of subscribers, each of said subscribers being associated with a directory number and having a subscriber profile, a method of directing a call from an originating subscriber to a called subscriber, said method comprising the steps of:

maintaining a record for at least one directory number called by the originating subscriber, said record comprising data associated with calls to said at least one directory number and being updated at each call made by the originating subscriber to said at least one directory number;

determining if said data indicates that calls to said at least one directory number meet a selected criterion; and in response to an affirmative determination in said step of determining:

placing said at least one directory number in a database of stored directory numbers within the subscriber profile of the originating subscriber, said database being located at at least one of said plurality of data nodes.

2. The method of claim 1 in which each stored directory number in said database is associated with a data node and, in which said method further comprises the steps of:

determining that the originating subscriber has made a call to a selected directory number of the stored directory numbers within said database; and directing signaling for setup of said call directly to the data node associated with said selected directory number.

3. The method of claim 1 in which a data node associated with said at least one directory number is a home data node of said at least one directory number.

4. The method of claim 1 in which said step of determining comprises calculating a value dependent on the number of calls made to said at least one directory number from the originating subscriber.

5. The method of claim 4 in which said value calculated in said step of determining further depends on the time of said call.

6. In a telecommunications system comprising a plurality of mobile stations and a plurality of data nodes, each of said data nodes including at least one base station having a coverage area, and wherein each of said plurality of mobile stations is capable of making calls to and receiving calls from one of a plurality of subscribers, each of said subscribers being associated with a directory number and having a subscriber profile, an apparatus for directing a call from an originating subscriber to a called subscriber, said apparatus comprising:

means for maintaining a record for at least one directory number called by the originating subscriber, said record comprising data associated with calls to said at least one directory number and being updated at each call made by the originating subscriber to said at least one directory number;

means for determining if said data indicates that calls to said at least one directory number meet a selected criterion and generating a signal in response to an affirmative determination; and means for placing said at least one directory number in a database for stored directory numbers within the subscriber profile of the originating subscriber in response to said signal generated in said means for determining, said database being located at at least one of said plurality of data nodes.

7. The apparatus of claim 6 in which each stored directory number in said database is associated with a data node and, in which said apparatus further comprises:

means for determining that the originating subscriber has made a call to a selected directory number of the stored directory numbers within said database; and means for directing signaling for setup of said call directly to the data node associated with said selected directory number.

8. The apparatus of claim 6 in which a data node associated with said at least one directory number is a home data node of said at least one directory number.

9. The apparatus of claim 7 in which said means for determining comprises means for calculating a value dependent on the number of calls made to said at least one directory number from the originating subscriber.

10. The apparatus of claim 9 in which said value calculated by said means for determining further depends on the time of said call.

11. In a telecommunications system comprising a plurality of mobile stations and a plurality of data nodes, each of said data nodes including at least one base station having a coverage area, and wherein each of said plurality of mobile stations is capable of making calls to and receiving calls from one of a plurality of subscribers, each of said subscribers being associated with a directory number and having a subscriber profile, an apparatus for directing a call from an originating subscriber to a called subscriber, said apparatus comprising:

a record maintainer for maintaining a record for at least one directory number called by the originating subscriber, said record comprising data associated with calls to said at least one directory number and being updated at each call made by the originating subscriber to said at least one directory number;

a determiner for determining if said data indicates that calls to said at least one directory number meet a selected criterion and generating a signal in response to an affirmative determination; and a database of stored directory numbers within the subscriber profile of the originating subscriber, wherein said at least one directory number is stored in said database in response to said signal generated in said means for determining, said database being located at at least one of said plurality of data nodes.

* * * * *

UNITED STATES PATENT AND TRADEMARK OFFICE
CERTIFICATE OF CORRECTION

PATENT NO. : 5,956,637
DATED : September 21, 1999
INVENTOR(S) : Jonas Ericsson et al.

It is certified that error appears in the above-identified patent and that said Letters Patent is hereby corrected as shown below:

Column 9,
Lines 4 and 5, replace "k [subscript on] m" with -- $k_m$ --

Signed and Sealed this

Sixth Day of November, 2001

Attest:

NICHOLAS P. GODICI
Attesting Officer    Acting Director of the United States Patent and Trademark Office